US011829582B2

(12) United States Patent
Jitkoff et al.

(10) Patent No.: US 11,829,582 B2
(45) Date of Patent: *Nov. 28, 2023

(54) TAB VISIBILITY

(71) Applicant: GOOGLE LLC, Mountain View, CA (US)

(72) Inventors: John Nicholas Jitkoff, Palo Alto, CA (US); Glen Murphy, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,942

(22) Filed: Jan. 9, 2023

(65) Prior Publication Data
US 2023/0161462 A1    May 25, 2023

Related U.S. Application Data

(63) Continuation of application No. 17/249,157, filed on Feb. 22, 2021, now Pat. No. 11,556,227, which is a
(Continued)

(51) Int. Cl.
*G06F 3/0483*    (2013.01)
*G06F 9/451*    (2018.01)
(Continued)

(52) U.S. Cl.
CPC .......... *G06F 3/0483* (2013.01); *G06F 3/0482* (2013.01); *G06F 3/04812* (2013.01);
(Continued)

(58) Field of Classification Search
CPC ...... G06F 3/0483; G06F 9/451; G06F 3/0482; G06F 9/44505; G06F 3/04812;
(Continued)

(56) References Cited

U.S. PATENT DOCUMENTS 6,433,801 B1    8/2002   Moon et al.
7,240,364 B1    7/2007   Branscomb et al.
(Continued)

FOREIGN PATENT DOCUMENTS

CA    2679738 A1    8/2007
CA    2390037 C     2/2010
(Continued)

*Primary Examiner* — Steven P Sax
(74) *Attorney, Agent, or Firm* — Brake Hughes Bellermann LLP

(57) ABSTRACT

According to one general aspect, a computing device may include an application configured to create a tab in a context of a window, and a window manager configured to register the tab with a first UI element registry. The window manager may be configured to receive, over a network, at least a portion of a second UI element registry from a secondary window manager of a secondary computing device. The portion of the second UI element registry may identify a remote tab previously registered with the secondary window manager. The window manager may be configured to cause a display to provide a graphical arrangement of the tab and the remote tab.

17 Claims, 9 Drawing Sheets

Related U.S. Application Data continuation of application No. 16/420,745, filed on May 23, 2019, now Pat. No. 10,928,990, which is a continuation of application No. 14/254,553, filed on Apr. 16, 2014, now Pat. No. 10,310,713, which is a continuation of application No. 12/903,642, filed on Oct. 13, 2010, now Pat. No. 8,713,465.

(60) Provisional application No. 61/360,194, filed on Jun. 30, 2010, provisional application No. 61/251,289, filed on Oct. 13, 2009.

(51) Int. Cl.
*G06F 3/0482* (2013.01)
*G06F 9/445* (2018.01)
*G06F 3/04812* (2022.01)
*G06F 7/00* (2006.01)
*G06F 17/00* (2019.01)

(52) U.S. Cl.
CPC ............ *G06F 7/00* (2013.01); *G06F 9/44505* (2013.01); *G06F 9/451* (2018.02); *G06F 17/00* (2013.01); *H04M 2215/7236* (2013.01)

(58) Field of Classification Search
CPC .......... G06F 7/00; G06F 17/00; G06F 3/0484; H04M 2215/7236; H04M 2215/724; H04M 2215/725; G06Q 10/063
See application file for complete search history.

(56) References Cited

U.S. PATENT DOCUMENTS

| | | |
|---|---|---|
| 7,865,306 B2 | 1/2011 | Mays |
| 7,917,604 B1 | 3/2011 | Gruttadauria et al. |
| 7,926,012 B1 | 4/2011 | Parimi et al. |
| 8,001,145 B1 | 8/2011 | Cornali |
| 8,676,273 B1 | 3/2014 | Fujisaki |
| 8,713,465 B1 | 4/2014 | Jitkoff et al. |
| 8,756,523 B2 | 6/2014 | Chiba et al. |
| 8,762,878 B1 | 6/2014 | Weber et al. |
| 8,762,879 B1 | 6/2014 | Goodger et al. |
| 2002/0133453 A1 | 9/2002 | Rose |
| 2002/0174202 A1 | 11/2002 | Kohyama et al. |
| 2002/0175948 A1 | 11/2002 | Nielsen et al. |
| 2003/0197735 A1 | 10/2003 | Woltzen |
| 2004/0104945 A1 | 6/2004 | Kearns et al. |
| 2004/0113948 A1 | 6/2004 | Shahrbabaki et al. |
| 2004/0228531 A1 | 11/2004 | Fernandez et al. |
| 2004/0268267 A1 | 12/2004 | Moravcsik |
| 2005/0102358 A1 | 5/2005 | Gold et al. |
| 2005/0138118 A1 | 6/2005 | Banatwala et al. |
| 2005/0193330 A1 | 9/2005 | Peters |
| 2006/0031077 A1 | 2/2006 | Dalton et al. |
| 2006/0036965 A1 | 2/2006 | Harris et al. |
| 2006/0085515 A1* | 4/2006 | Kurtz ...................... H04L 51/04 709/207 |
| 2006/0173824 A1* | 8/2006 | Bensky ............... G06Q 10/107 |
| 2006/0184875 A1 | 8/2006 | Okada et al. |
| 2006/0230058 A1* | 10/2006 | Morris ................ G06Q 10/063 707/999.102 |
| 2006/0235280 A1 | 10/2006 | Vonk et al. |
| 2006/0288111 A1 | 12/2006 | Katinsky et al. |
| 2007/0016442 A1 | 1/2007 | Stroup |
| 2007/0130177 A1* | 6/2007 | Schneider ........... G06F 16/4393 |
| 2007/0220441 A1* | 9/2007 | Melton ................. G06F 16/958 715/781 |
| 2008/0005686 A1 | 1/2008 | Singh |
| 2008/0016456 A1 | 1/2008 | Friedland et al. |
| 2008/0046840 A1 | 2/2008 | Melton et al. |
| 2008/0065982 A1 | 3/2008 | Evanchik et al. |
| 2008/0071663 A1* | 3/2008 | Busby .................... G06Q 40/04 705/37 |
| 2008/0082935 A1 | 4/2008 | Relyea et al. |
| 2008/0140523 A1 | 6/2008 | Mahoney et al. |
| 2008/0147562 A1 | 6/2008 | Allen et al. |
| 2008/0177994 A1 | 7/2008 | Mayer |
| 2008/0235064 A1 | 9/2008 | Gulko et al. |
| 2008/0235249 A1 | 9/2008 | Stephens et al. |
| 2008/0242362 A1 | 10/2008 | Duarte |
| 2008/0295116 A1 | 11/2008 | Hoshino et al. |
| 2008/0300962 A1 | 12/2008 | Cawston et al. |
| 2008/0301562 A1 | 12/2008 | Berger et al. |
| 2009/0100242 A1 | 4/2009 | Lin et al. |
| 2009/0119589 A1 | 5/2009 | Rowell et al. |
| 2009/0228839 A1 | 9/2009 | Iga |
| 2009/0249359 A1 | 10/2009 | Caunter et al. |
| 2009/0287682 A1 | 11/2009 | Fujioka et al. |
| 2009/0313334 A1* | 12/2009 | Seacat ..................... H04L 51/04 709/206 |
| 2010/0030744 A1 | 2/2010 | Deshan et al. |
| 2010/0070928 A1 | 3/2010 | Goodger et al. |
| 2010/0087175 A1 | 4/2010 | Roundtree |
| 2010/0107115 A1 | 4/2010 | Sareen et al. |
| 2010/0161587 A1* | 6/2010 | Sullivan .............. G06F 16/9562 715/206 |
| 2010/0169772 A1 | 7/2010 | Stallings et al. |
| 2010/0180225 A1 | 7/2010 | Chiba et al. |
| 2010/0210240 A1 | 8/2010 | Mahaffey et al. |
| 2010/0287525 A1 | 11/2010 | Wagner |
| 2011/0179365 A1 | 7/2011 | Ikegami |
| 2011/0208616 A1 | 8/2011 | Gorman et al. |

FOREIGN PATENT DOCUMENTS

| | | | |
|---|---|---|---|
| JP | 2009028442 A | * | 2/2009 |
| JP | 2010152797 A | | 7/2010 |
| KR | 20110011002 A | | 2/2011 |
| WO | 2010025474 A2 | | 3/2010 |
| WO | WO-2010025474 A2 | * | 3/2010 ......... G06F 16/9577 |

* cited by examiner

FIG. 3
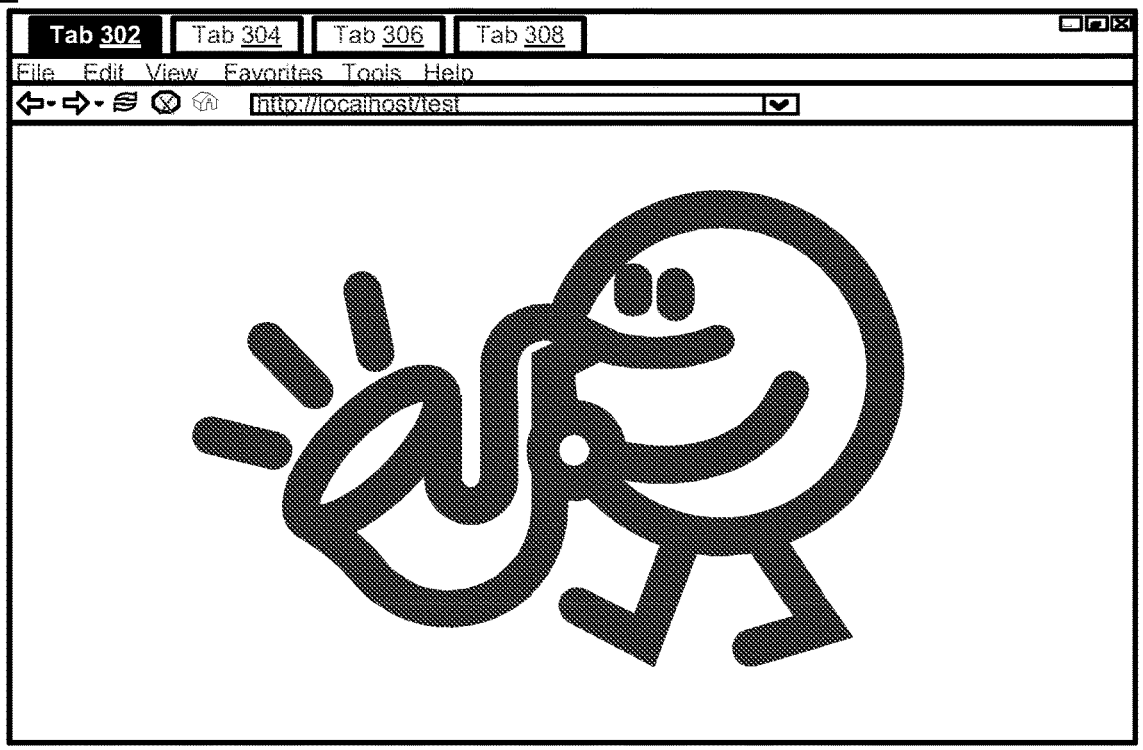
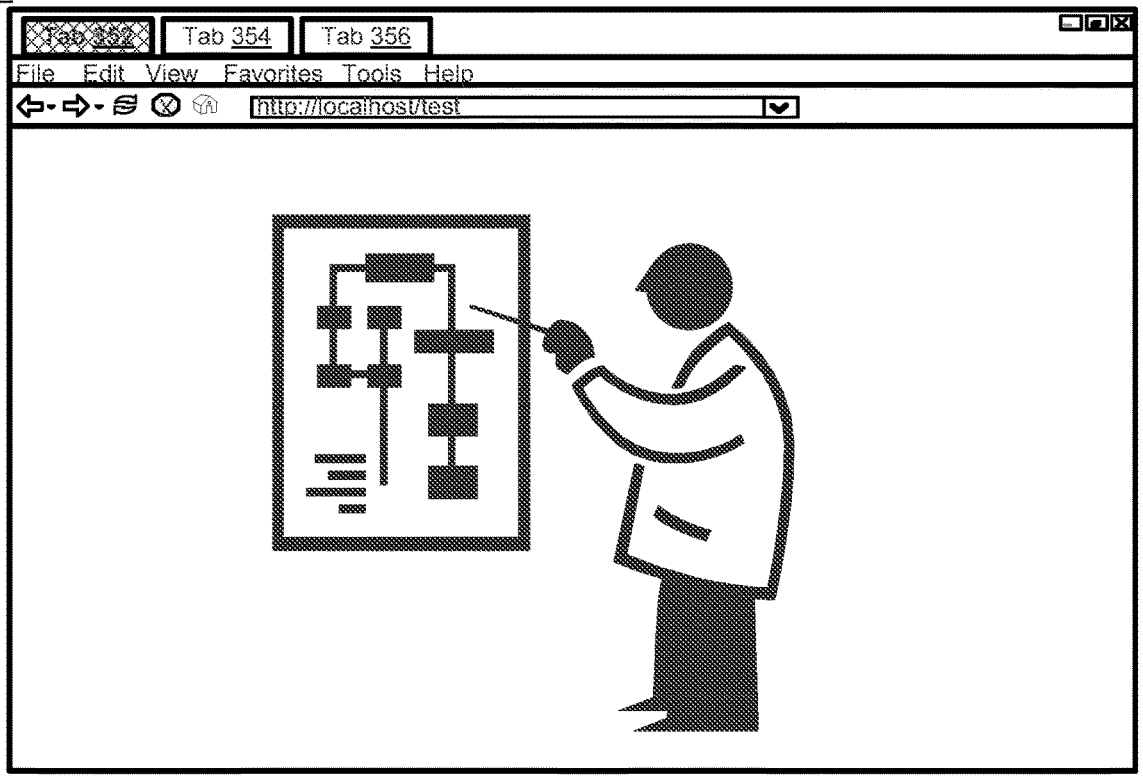

FIG. 5
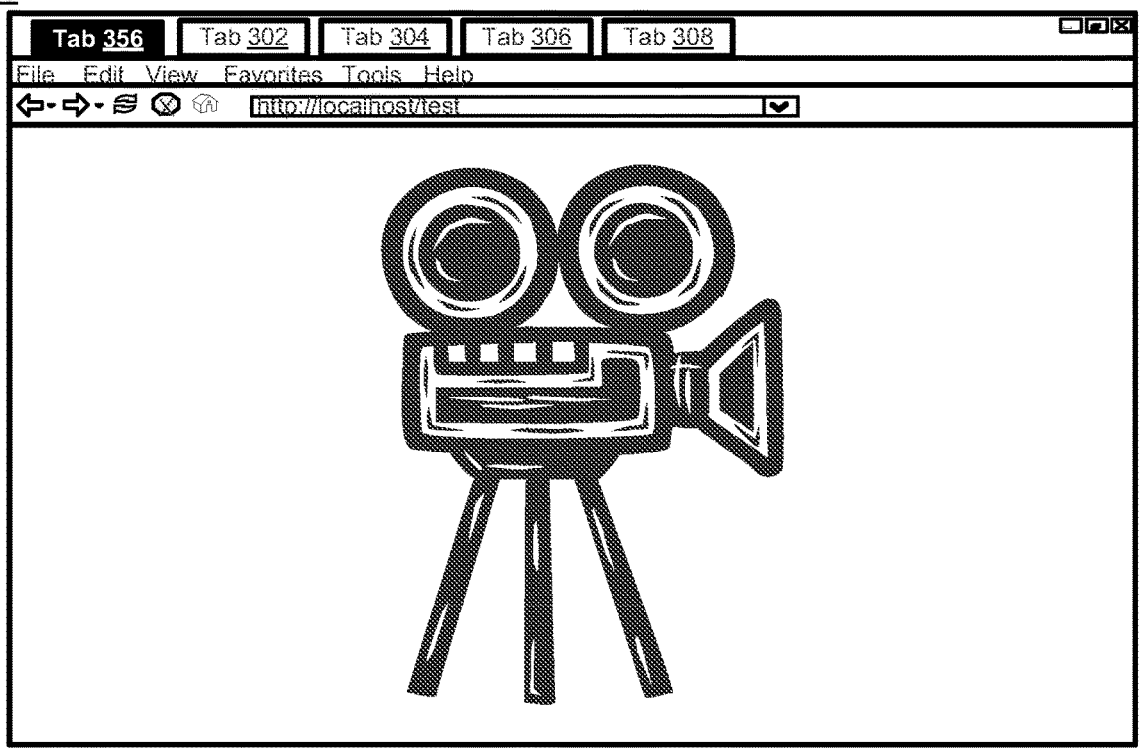
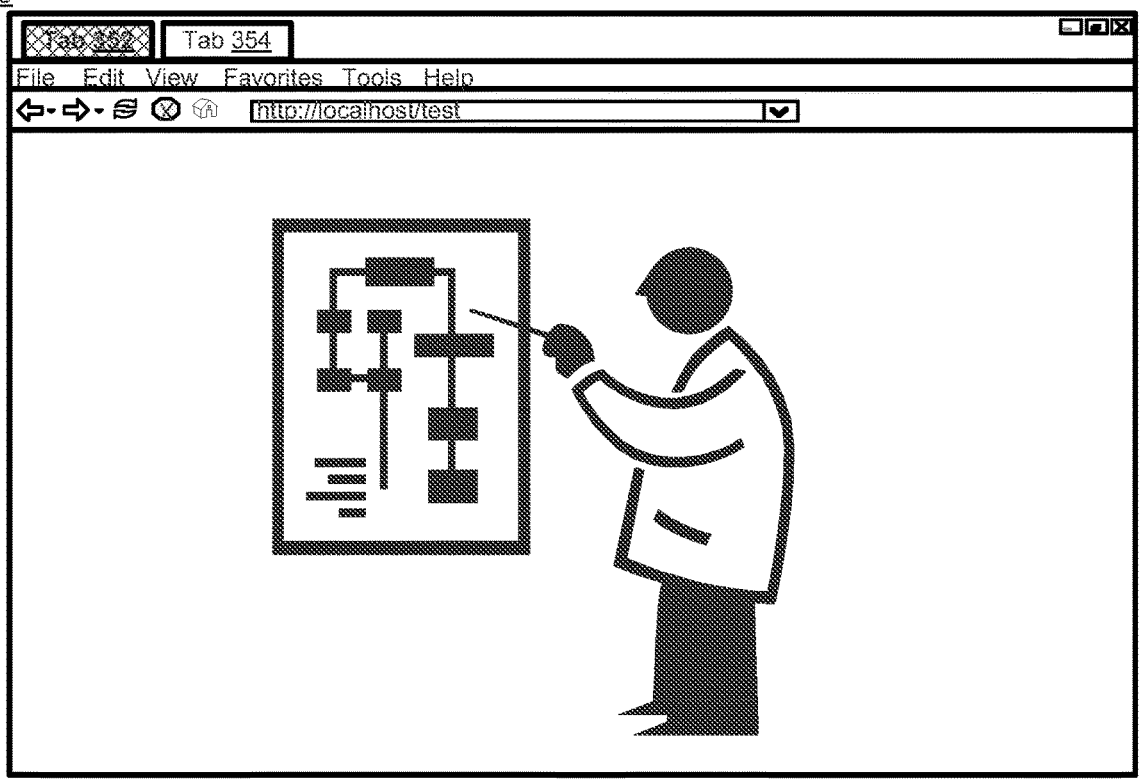

600

600

700

TAB VISIBILITY

CROSS-REFERENCE TO RELATED APPLICATIONS

This application is a continuation of U.S. application Ser. No. 17/249,157, filed Feb. 22, 2021, which is a continuation of U.S. application Ser. No. 16/420,745, filed May 23, 2019, which is a continuation of U.S. application Ser. No. 14/254, 553, filed on Apr. 16, 2014, now U.S. Pat. No. 10,310,713, which is a continuation of U.S. application Ser. No. 12/903, 642, filed on Oct. 13, 2010, now U.S. Pat. No. 8,713,465, which claims the benefit of U.S. Provisional Application No. 61/251,289, filed Oct. 13, 2009, and also claims the benefit of U.S. Provisional Application No. 61/360,194, filed on Jun. 30, 2010. The subject matter of all the above listed earlier filed applications is hereby incorporated by reference in their entireties.

TECHNICAL FIELD

This description relates to managing a graphical user interface, and more specifically to managing tabs within the graphical user interface.

BACKGROUND

Generally, modern graphical user interfaces (GUIs) are based upon the idea of a "window." In computing, a "window" is a visual area, usually rectangular, containing some kind of user interface. Windows are often two dimensional objects arranged on a plane called the "desktop." In a modern full-featured windowing system windows may be resized, moved, hidden, restored or closed, etc.

Windows usually include other graphical objects, possibly including a menu-bar, toolbars, controls, icons and often a working area. In the working area, the document, image, folder contents or other main object is often displayed. Around the working area within the bounding window, there may be other smaller window areas, sometimes called panes or panels, showing relevant information or options. The working area may be capable of holding only one (single document interface) or more than one main object in a multiple document interface. In some applications, e.g., web browsers, multiple documents are displayed in individual "tabs." These tabs are typically displayed one at a time, and are selectable via a tab-bar which sometimes resides above the contents of an individual tab.

Modern operating systems generally allow for the manipulation and selection of windows. A well known example is the Alt-Tab feature of Microsoft™ Windows™ systems (e.g., Windows XP™, Windows Vista™, Windows 7™, etc.), which allows a user to flip through active windows via the Alt-Tab keyboard shortcut. Alternatively, the Macintosh™ OS X™ system employs a window manager tool called "Exposé™" which tiles thumbnails or miniature versions of the windows within the display, allowing a user to select a window to move to the foreground.

SUMMARY

According to one general aspect, a method for manipulating tabs within a graphical user interface may include associating a tab with a window in a superior-subordinate hierarchal relationship, wherein the tab is the subordinate in the relationship, and wherein the tab and window are graphical user interface elements. The method may also include registering the tab and the tab's association with the window with a window manager, wherein the window manager is configured to manage tabs and windows within a graphical user interface. The method may include receiving a command, from a user, to display an organized representation of one or more tabs registered with the widow manager. The method may further include organizing the tabs registered with the window manager according to a predetermined organizational scheme. The method may include displaying the organized representation of the tabs to the user via a graphical display.

According to another general aspect, an apparatus may include an application interface, a user interface element or tab registry, a tab selection manager, and a tab organizer. The application interface may be configured to receive a tab association indicating that a tab is in a superior-subordinate hierarchal relationship with a window, wherein the tab is the subordinate in the relationship, and wherein the tab and window are graphical user interface elements. The user interface element registry may be configured to register the tab and the tab's association with the window. The tab selection manager may be configured to receive a command, from a user, to display an organized representation of one or more tabs registered with the user interface element registry. The tab organizer may be configured to organize the tabs registered with the user interface element registry according to a predetermined organizational scheme. The tab selection manager may be further configured to display the organized representation of the tabs to the user via a graphical display.

According to another general aspect, a computer-readable medium may be tangibly embodied and include executable code that causes an apparatus to: associate a tab with a window in a superior-subordinate hierarchal relationship, wherein the tab is the subordinate in the relationship, and wherein the tab and window are graphical user interface elements; register the tab and the tab's association with the window with a window manager, wherein the window manager is configured to manage tabs and windows within a graphical user interface; receive a command, from a user, to display an organized representation of one or more tabs registered with the widow manager; organize the tabs registered with the widow manager according to a predetermined organizational scheme; and display the organized representation of the tabs to the user via a graphical display.

The details of one or more implementations are set forth in the accompanying drawings and the description below. Other features will be apparent from the description and drawings, and from the claims.

A system and/or method for manipulating a graphical user interface, substantially as shown in and/or described in connection with at least one of the figures, as set forth more completely in the claims.

BRIEF DESCRIPTION OF THE DRAWINGS

FIG. 3 is a diagram of an example embodiment of a graphical user interface in accordance with the disclosed subject matter.

FIG. 5 is a diagram of an example embodiment of a graphical user interface in accordance with the disclosed subject matter.

Like reference symbols in the various drawings indicate like elements.

DETAILED DESCRIPTION

Described herein is a device and a technique for operating a device, or application (e.g., a web browser) such that tabs or other graphical user interface (GUI) elements (e.g., windows, tab groups, etc.) may be manipulated and organized. In various embodiments, tabs may be associated with a window or other GUI element (e.g., virtual desktop, etc.). In some embodiments, the GUI may display and organize the various tabs, regardless of the tabs' association with their respective windows. A user may then move, remove, copy, etc. a tab from one window to another window. It is understood that the above are merely a few illustrative examples to which the disclosed subject matter is not limited.

Figure 1:
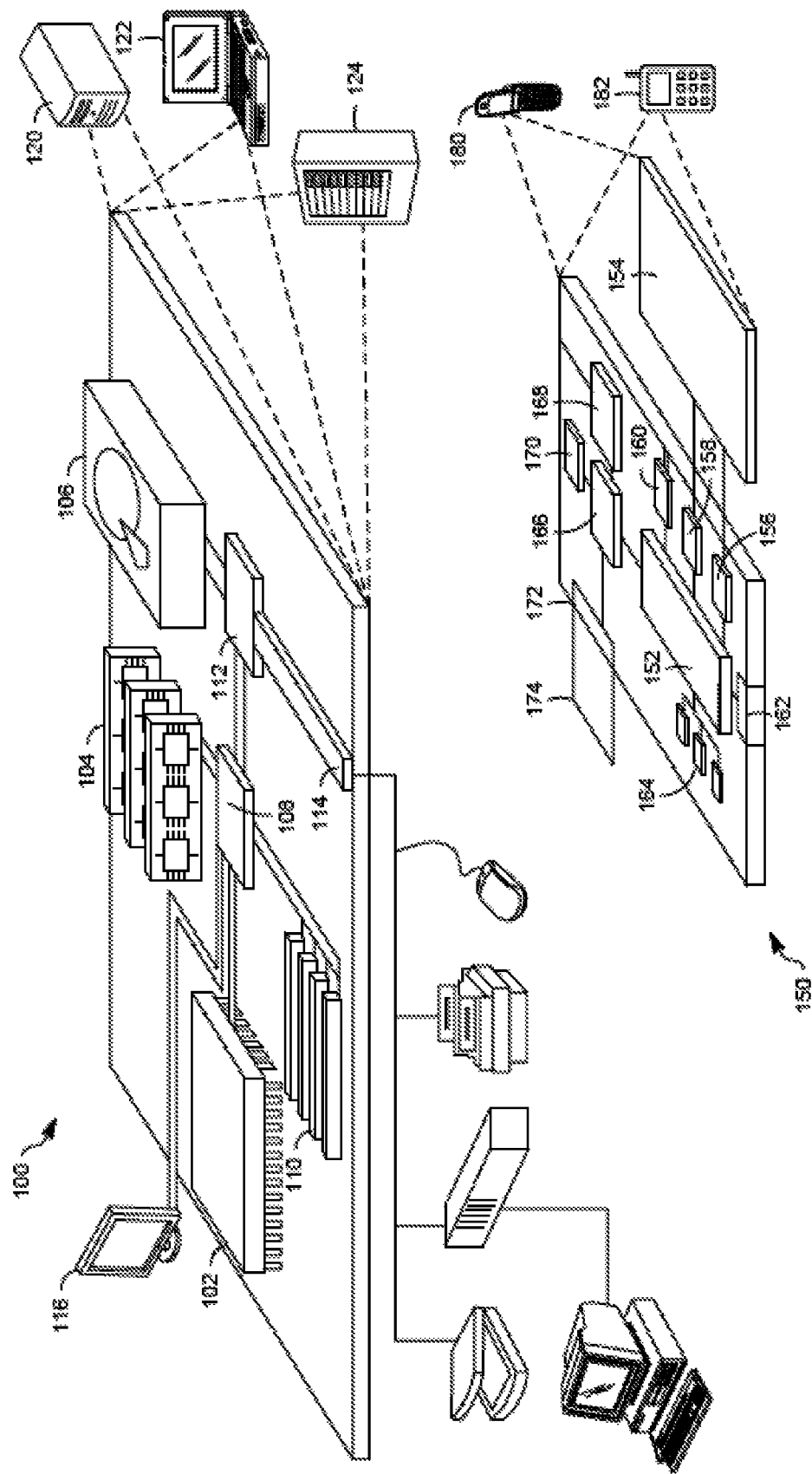
FIG. 1 is a block diagram of an example embodiment of a system in accordance with the disclosed subject matter.

FIG. 1 shows an example of a generic computer device 100 and a generic mobile computer device 150, which may be used with the techniques described here. Computing device 100 is intended to represent various forms of digital computers, such as laptops, desktops, workstations, personal digital assistants, servers, blade servers, mainframes, and other appropriate computers. Computing device 150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 100 includes a processor 102, memory 104, a storage device 106, a high-speed interface 108 connecting to memory 104 and high-speed expansion ports 110, and a low speed interface 112 connecting to low speed bus 114 and storage device 106. Each of the components 102, 104, 106, 108, 110, and 112, are interconnected using various busses, and may be mounted on a common motherboard or in other manners as appropriate. The processor 102 can process instructions for execution within the computing device 100, including instructions stored in the memory 104 or on the storage device 106 to display graphical information for a graphical user interface (GUI) on an external input/output device, such as display 116 coupled to high speed interface 108. In other implementations, multiple processors and/or multiple buses may be used, as appropriate, along with multiple memories and types of memory. Also, multiple computing devices 100 may be connected, with each device providing portions of the necessary operations (e.g., as a server bank, a group of blade servers, or a multi-processor system, etc.).

The memory 104 stores information within the computing device 100. In one implementation, the memory 104 includes a volatile memory unit or units. In another implementation, the memory 104 includes a non-volatile memory unit or units. The memory 104 may also be another form of computer-readable medium, such as a magnetic or optical disk.

The storage device 106 is capable of providing mass storage for the computing device 100. In one implementation, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 104, the storage device 106, or memory on processor 102.

The high speed controller 108 manages bandwidth-intensive operations for the computing device 100, while the low speed controller 112 manages lower bandwidth-intensive operations. Such allocation of functions is exemplary only. In one implementation, the high-speed controller 108 is coupled to memory 104, display 116 (e.g., through a graphics processor or accelerator), and to high-speed expansion ports 110, which may accept various expansion cards (not shown). In the implementation, low-speed controller 112 is coupled to storage device 106 and low-speed expansion port 114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 100 may be implemented in a number of different forms, as shown in the figure. For example, it may be implemented as a standard server 120, or multiple times in a group of such servers. It may also be implemented as part of a rack server system 124. In addition, it may be implemented in a personal computer such as a laptop computer 122. Alternatively, components from computing device 100 may be combined with other components in a mobile device (not shown), such as device 150. Each of such devices may contain one or more of computing device 100, 150, and an entire system may be made up of multiple computing devices 100, 150 communicating with each other.

Computing device 150 includes a processor 152, memory 164, an input/output (I/O) device such as a display 154, a communication interface 166, and a transceiver 168, among other components. The device 150 may also be provided with a storage device, such as a micro-drive or other device, to provide additional storage. Each of the components 150, 152, 164, 154, 166, and 168, are interconnected using various buses, and several of the components may be mounted on a common motherboard or in other manners as appropriate.

The processor 152 can execute instructions within the computing device 150, including instructions stored in the memory 164. The processor may be implemented as a chipset of chips that include separate and multiple analog and digital processors. The processor may provide, for example, for coordination of the other components of the device 150, such as control of user interfaces, applications run by device 150, and wireless communication by device 150.

Processor 152 may communicate with a user through control interface 158 and display interface 156 coupled to a display 154. The display 154 may be, for example, a TFT LCD (Thin-Film-Transistor Liquid Crystal Display) or an OLED (Organic Light Emitting Diode) display, or other appropriate display technology. The display interface 156 may comprise appropriate circuitry for driving the display 154 to present graphical and other information to a user. The control interface 158 may receive commands from a user and convert them for submission to the processor 152. In addition, an external interface 162 may be provide in communication with processor 152, so as to enable near area communication of device 150 with other devices. External interface 162 may provide, for example, for wired communication in some implementations, or for wireless communication in other implementations, and multiple interfaces may also be used.

The memory 164 stores information within the computing device 150. The memory 164 can be implemented as one or more of a computer-readable medium or media, a volatile memory unit or units, or a non-volatile memory unit or units. Expansion memory 174 may also be provided and connected to device 150 through expansion interface 172, which may include, for example, a SIMM (Single In Line Memory Module) card interface. Such expansion memory 174 may provide extra storage space for device 150, or may also store applications or other information for device 150. Specifically, expansion memory 174 may include instructions to carry out or supplement the processes described above, and may include secure information also. Thus, for example, expansion memory 174 may be provide as a security module for device 150, and may be programmed with instructions that permit secure use of device 150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 164, expansion memory 174, or memory on processor 152, that may be received, for example, over transceiver 168 or external interface 162.

Device 150 may communicate wirelessly through communication interface 166, which may include digital signal processing circuitry where necessary. Communication interface 166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 168. In addition, short-range communication may occur, such as using a Bluetooth, WiFi, or other such transceiver (not shown). In addition, GPS (Global Positioning System) receiver module 170 may provide additional navigation- and location-related wireless data to device 150, which may be used as appropriate by applications running on device 150.

Device 150 may also communicate audibly using audio codec 160, which may receive spoken information from a user and convert it to usable digital information. Audio codec 160 may likewise generate audible sound for a user, such as through a speaker, e.g., in a handset of device 150. Such sound may include sound from voice telephone calls, may include recorded sound (e.g., voice messages, music files, etc.) and may also include sound generated by applications operating on device 150.

The computing device 150 may be implemented in a number of different forms, as shown in the figure. For example, it may be implemented as a cellular telephone 180. It may also be implemented as part of a smart phone 182, personal digital assistant, or other similar mobile device.

Figure 2:
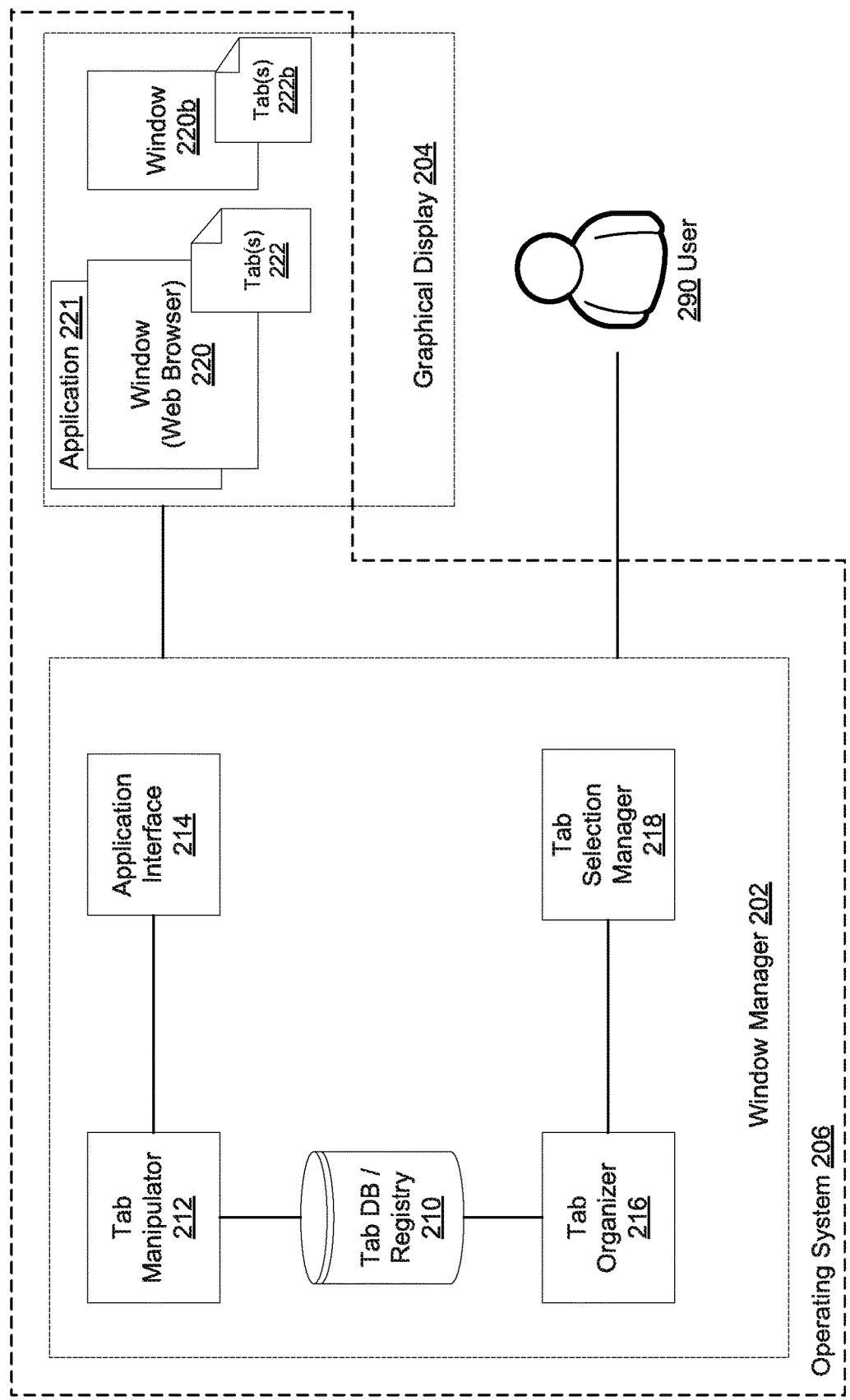
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a computer or other computing device (e.g., smart-phone, etc.) that executes an operating system 206, a window manager 202 and an application 221 or window 220. In one embodiment, the computer may include or be connected to a graphical display 204 (e.g., a monitor, touch-screen, etc.) and be controlled, at least in part, by a user 290.

In one embodiment, the user 290 may be running or causing the operating system 206 to execute an application 221 or window 220. For purposes of illustration the window 220 will be referred to as a web browser, although it is understood that the above is merely one illustrative example to which the disclosed subject matter is not limited. In various embodiments, this window 220 may include a plurality of panes or tabs 222.

In some traditional windows-based graphical user interfaces (GUIs), a window manager would recognize and manage only the window 220. If two or more windows 220 & 220*b* existed and were displayed within the display 204, the window manager would keep track of merely those windows 220 & 220*b*. However, a hierarchal window manager 202 may be configured to register and manipulate not only the windows 220 & 220*b* but also the tabs 222 & 222*b*.

In one embodiment, the tabs 222 may be associated with the window 220. In such an embodiment, this association may include a hierarchical relationship between the window 220 and the tabs 222. The window 220 may be superior or hierarchically higher than the tabs 222. As such, the tabs 222 may be said to be in a superior-subordinate relationship with the window 220, wherein the tabs 222 are the subordinates or hierarchically lower in the relationship. In such a relationship, when something occurs to the window 220 (e.g., closed, moved, resized, etc.) the subordinate tabs 222 may follow such an action (e.g., closing the tab, moving the tab, resizing relative to the window, etc.).

In various embodiments, once the window 220 creates or generates a tab 222, the window may establish the hierarchal relationship between the two GUI elements. Further, the window 220 or the application 221 which generated the window 220, may register the newly generated tab 222 and the tab's 222 association and relationship with the window 220 with the window manager 202.

In such an embodiment, the window manager 202 may receive this association via an application interface 214. The application interface 214 may be configured to communicate commands and data between the window manager 202 and the graphical application(s) 221 executing within the operating system 206. The application interface 214 may pass this information to a tab manipulator 212. The tab manipulator 212, or in some embodiments, the application interface 214 itself, may store this association and hierarchal relationship information within a tab database (DB) or registry 210. In various embodiments, the tab DB or registry 210 may be configured to store information and hierarchal associations or relationships of a plurality of GUI elements (e.g., windows, tabs, etc.). In such an embodiment, the tab DB or registry 210 may be generally referred to as a GUI element registry.

Likewise, similar actions may occur when creating a second window 220b and that window's 220b associated tabs 222b. In various embodiments, the second window 220b may be created by the application 221 or another application (not shown). Further, while only two windows (windows 220 and 220b) are shown, it is understood that the disclosed subject matter is not limited to a specific number of applications, windows, or tabs.

In various embodiments, the user 290 may wish to select one of the tabs (e.g., from tabs 222 or 222b) to bring to the foreground or otherwise select as the tab to receive "focus." In the computing context, a UI element is considered to "have focus" if the operating system 206 has selected or identified that UI element as the proper element to receive user input. In such an embodiment, the user 290 may indicate their desire (e.g., via a keyboard combination, mouse click, shaking the device, etc.) to see a display of tabs 222 & 222b organized according to a predetermined organizational scheme.

In such an embodiment, the window manager 202 may be configured to receive such a command from the user 290. The window manager 202 or the tab organizer 216 may be configured to organize the tabs 222 & 222b or representations thereof that are registered with the window manger 202 and stored within the tab DB or registry 210. In such an embodiment, the organization may occur regardless of the tab's association with a window (e.g., window 220 or 220b). The window manager 202 or the tab selection manager 218 may be configured to then display the organized representation of the tabs 222 to the user 290 via the display 204. Such a display of the tabs 222 may be seen in FIG. 4, and discussed in more detail below in reference to that figure.

In one embodiment, the tab organizer 216 may be configured to organize the representation of the tabs 222 & 222b according to a predetermined system or scheme of organization. For example, in one system of organization, tabs 222 and 222b may be sorted according to the time the tab was most recently accessed. In another embodiment, the tabs 222 and 222b may be grouped according to a functional definition associated with the tab (e.g., media player, document, commerce, etc.). Other systems of organization may include sorting by time created, grouping by window or other hierarchal UI element, most recently updated, least recently used, associated filename, directory, or universal resource locator (URL), memory or other system 200 resources used by the tabs, associated service provider (e.g., Netflix, Amazon, etc.), etc. It is understood that the above are merely a few illustrative examples to which the disclosed subject matter is not limited.

In various embodiments, the user 290 may wish to manipulate one or more tabs 222 and their associations with the windows 220 and 220b. For example, a user 290 may wish to move a tab 222 from window 220 to window 220b. In such an embodiment, the user 290 may indicate this using a command and the displayed organized tabs, although it is understood that the above is merely one illustrative example to which the disclosed subject matter is not limited.

The window manager 202 or the tab manipulator 212 may be configured to change the association of the tab 222 from the window 220 to window 220b. It may do this by altering the association and the hierarchal relationship between the UI elements (tabs, windows, etc.) stored within the tab DB or repository 210. The tab manipulator 212 may communicate, via the application interface 214, with the application 221 or window 220 to delete or remove the tab 222 that has been disassociated with the window 220. The tab manipulator 212 may communicate with the window 220b to create or add the tab 222 that has been newly associated with the window 220b.

In various embodiments, the tab DB or registry 210 may include information regarding the tab 222 in addition to the tab 222's associations and hierarchal relationships. Such information may include information required to create the tab 222 anew (e.g., filename or URL used by the tab, status of the tab, user permissions associated with the tab, etc.). In another embodiment, the tab manipulator 212 may request this or similar information from the window 220 before instructing the window 220 to delete or remove the tab 222. This information may be provided to the new window 220b in order to make the movement of the tab 222 between windows as seamless as possible.

In various embodiments, other tab manipulation operations or commands may be performed by the tab manipulator 212 or the window manager 202. For example, a tab may be moved between windows, duplicated between windows, minimized or maximized within the display, removed from a window, etc. It is understood that the above are merely a few illustrative examples to which the disclosed subject matter is not limited.

FIG. 3 is a diagram of an example embodiment of a graphical user interface in accordance with the disclosed subject matter. In one embodiment, the GUI may include two windows, window 300 and window 350. In this illustrated embodiment the two windows are web browsers but it is understood that any applications may be included. The elements of FIG. 3 are used to describe the organization and manipulation of tab UI elements further described in FIGS. 4 and 5.

In one embodiment, the first window 300 may include four tabs: tabs 302, 304, 306, and 308. As shown, tab 302 is currently in the foreground and has "focus." Graphically the handle of tab 302 is highlighted to show this. Likewise, the second window 350 may include three tabs: tabs 352, 354, and 356. Tab 352 is in the foreground of window 350, but for purposes of this illustration window 350 does not have "focus." Window 300 and more specifically tab 302 of window 300 has "focus."

Figure 4:
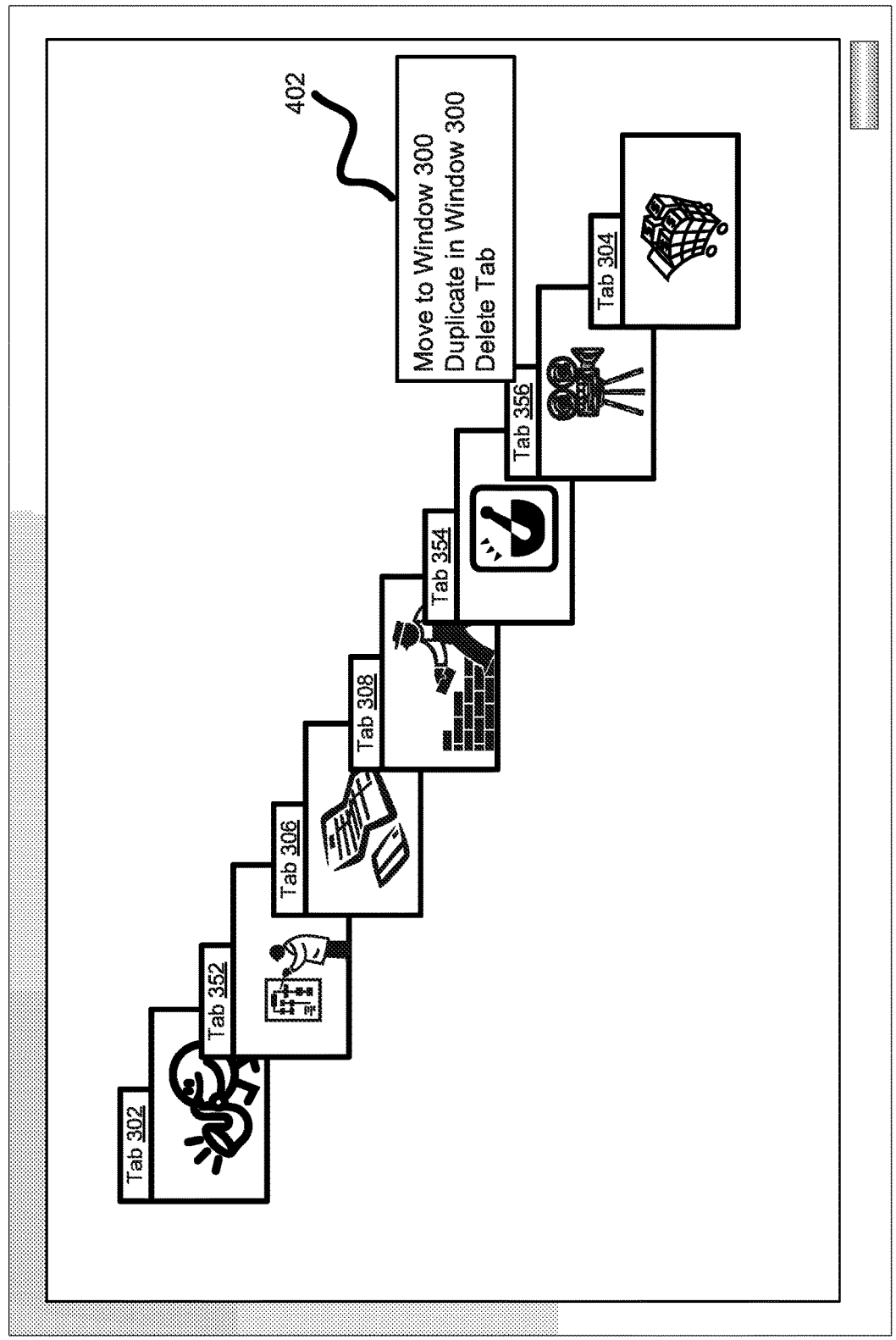
FIG. 4 is a diagram of an example embodiment of a graphical user interface in accordance with the disclosed subject matter.

FIG. 4 is a diagram of an example embodiment of a graphical user interface 400 in accordance with the disclosed subject matter. In various embodiments, the user may issue a command to the window manager to display an organized representation of the tabs registered with the window manager. In such an embodiment, the window manager may display the tabs as shown in UI 400.

UI 400 shows a series of tabs (tabs 302, 352, 306, 308, 354, 356, and 304) organized according without regard to which window (e.g., window 300 or 350) each of the tabs are associated or have a hierarchal relationship with. Instead, the tabs are displayed in a "most recently used" arrangement. Such a UI differs from traditional window-based switching UIs (e.g., Exposé, Alt-Tab, etc.) in that those UIs only show the UI elements at the window-level, and offer no further granularity, whereas UI 400 shows UI elements at the tab granularity level, and in other embodiments, may be configured to show multiple levels of UI element granularity (e.g., a desktop level, a window level, and a tab level, etc.) in which UI elements may be moved or manipulated within and between levels of granularity.

Further, UI 400 has the freedom to organize tabs in ways that do not take into consideration the windows associated with the particular tabs. As can be seen in FIG. 4, UI 400 has mixed tabs of various windows (e.g., windows 300 & 350) when organizing the tabs, such tabs, for example, tab 302 of window 300 is followed by tab 352 of window 350, and then followed by tab 306 of window 300. In various embodiments, the organization may show or take into consideration the associated windows or other hierarchal associations of the various tabs.

Also, while an organization scheme of "most recently used" is employed in UI 400 other organization schemes are contemplated, as described above. In various embodiments, a user may select between a variety of organization schemes or systems by selecting one of a number of various commands, each command corresponding to an organizational scheme. In one embodiment, a hot key may be employed to cycle through tabs regardless of which window or application the tabs belong. For example, the Ctrl-Tab key combination may employ the "most recently used" scheme, whereas the Shift-Tab key combination may employ a "least recently used" scheme. Although, it is understood that the above is merely one illustrative example to which the disclosed subject matter is not limited.

In various embodiments, the UI 400 may include means for manipulating the tabs and the tabs' relationships with the windows or other hierarchal UI elements. UI element or menu 402 illustrates that, in one embodiment, a right-click menu may be used to allow a user to issue commands to the window manager to manipulate the tab (e.g., tab 356) and the tab's association with the window UI elements. In another embodiment, other means for manipulating tabs may be employed (e.g., dragging tabs, double-clicking, touch/mouse gestures, buttons, etc.), although it is understood that the above is merely one illustrative example to which the disclosed subject matter is not limited. In the illustrated embodiment, the menu 402 allows a user to move the tab to another window, duplicate the tab in another window, or delete the tab, although it is understood that the above are merely a few illustrative examples to which the disclosed subject matter is not limited.

In some embodiments, the UI 400 may include static pictures or thumbnail versions of the tabs. In such an embodiment, the thumbnail may be a miniature picture of the tab designed to aid recognition of the tab, but scaled such that multiple tab thumbnails may fit within the graphical display. In the illustrated embodiment, UI 400 employs thumbnails of the tabs in order to display the multiple tabs within the graphical display. In various embodiments, the thumbnails may not be static pictures but may include active or dynamic versions or thumbnails of the tabs. In such an embodiment, as the tabs or the contents within the tabs change the thumbnails may change to reflect the change in the tab. For example, if a movie is playing in a tab (e.g., tab 356), an active thumbnail of that tab may show a small version of the movie.

In the illustrated embodiment, a user may choose to move tab 356 from window 350 (which tab 356 is currently associated with) to window 300. In such an embodiment, the window manager may obtain the necessary information to re-create tab 356 (e.g., URL, history, status, etc.) from window 350 or the application that created window 350. As described above, in various embodiments, this information may already be stored within a tab DB or registry. The window manager may then instruct window 300 or the application which created the window 300, to create tab 356 within window 300. As part of the creation of the tab 356 within window 300 the window manager may register a superior-subordinate relationship between the window 300 and the tab 356. The window manger may then instruct the window 350 to delete the tab 356 and, as a result or as port of that operation, the window manager may disassociate the tab 356 from window 350 and sever the superior-subordinate hierarchal relationship between the two.

In various embodiments, the window manager may determine if the moved or manipulated tab (e.g., tab 356) is compatible with the window or UI element to which it is to be moved. For example, the old and new windows may be created by different applications which are incapable of sharing information and tabs. To give a specific example, a video game application may not be capable of being associated with or being a superior in a hierarchal relationship to a tab comprising calendaring information. It is understood that the above is merely an illustrative example to which the disclosed subject matter is not limited.

FIG. 5 is a block diagram of an example embodiment of a graphical user interface in accordance with the disclosed subject matter. Again windows 300 and 350 are shown. However, as described above, tab 356 has been moved from window 350 and is now included or associated with window 300.

Figure 6A:
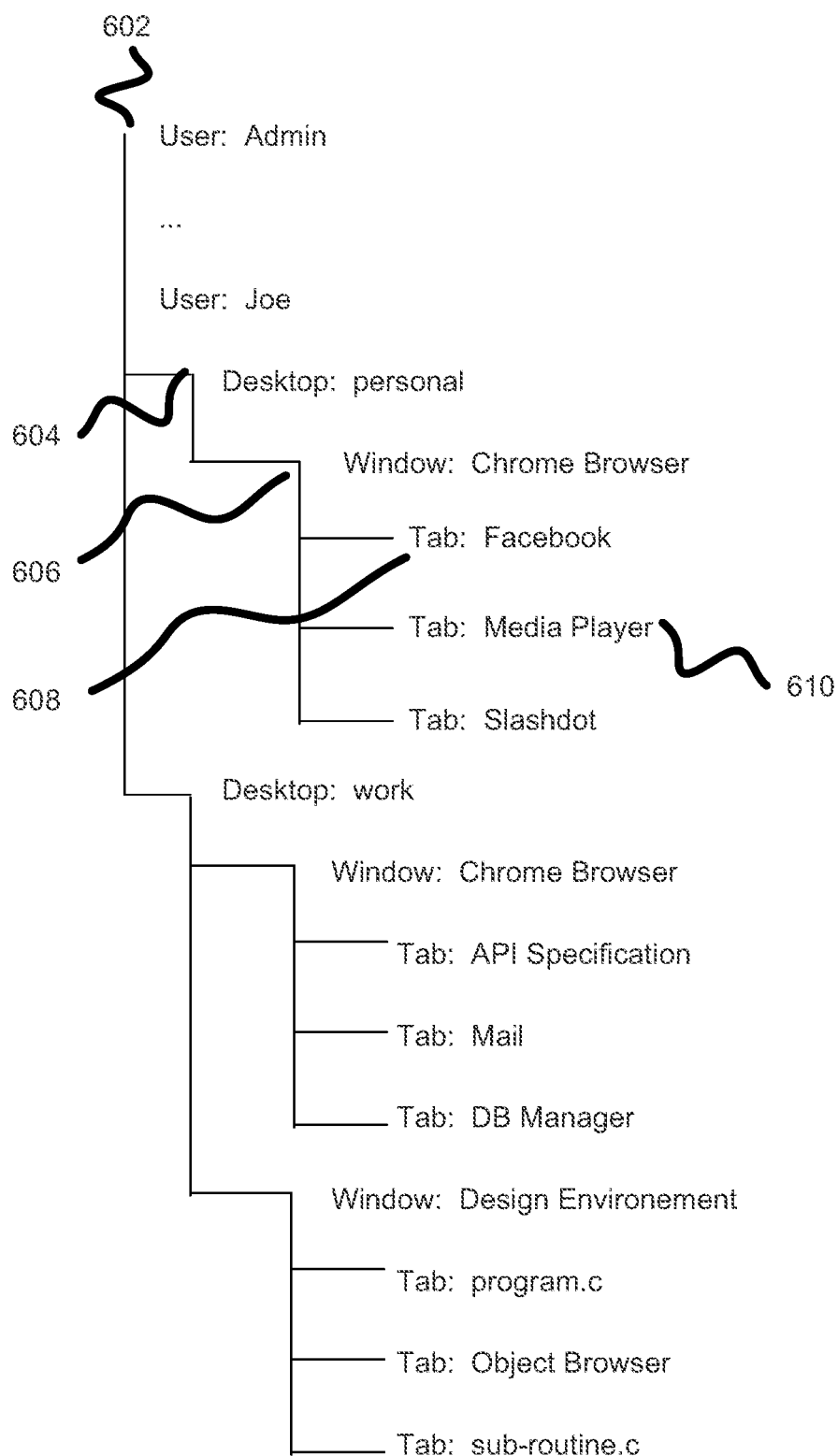
FIGS. 6a and 6b are a series of diagrams of an example embodiment of a system of graphical user interface elements in accordance with the disclosed subject matter.
Figure 6B:
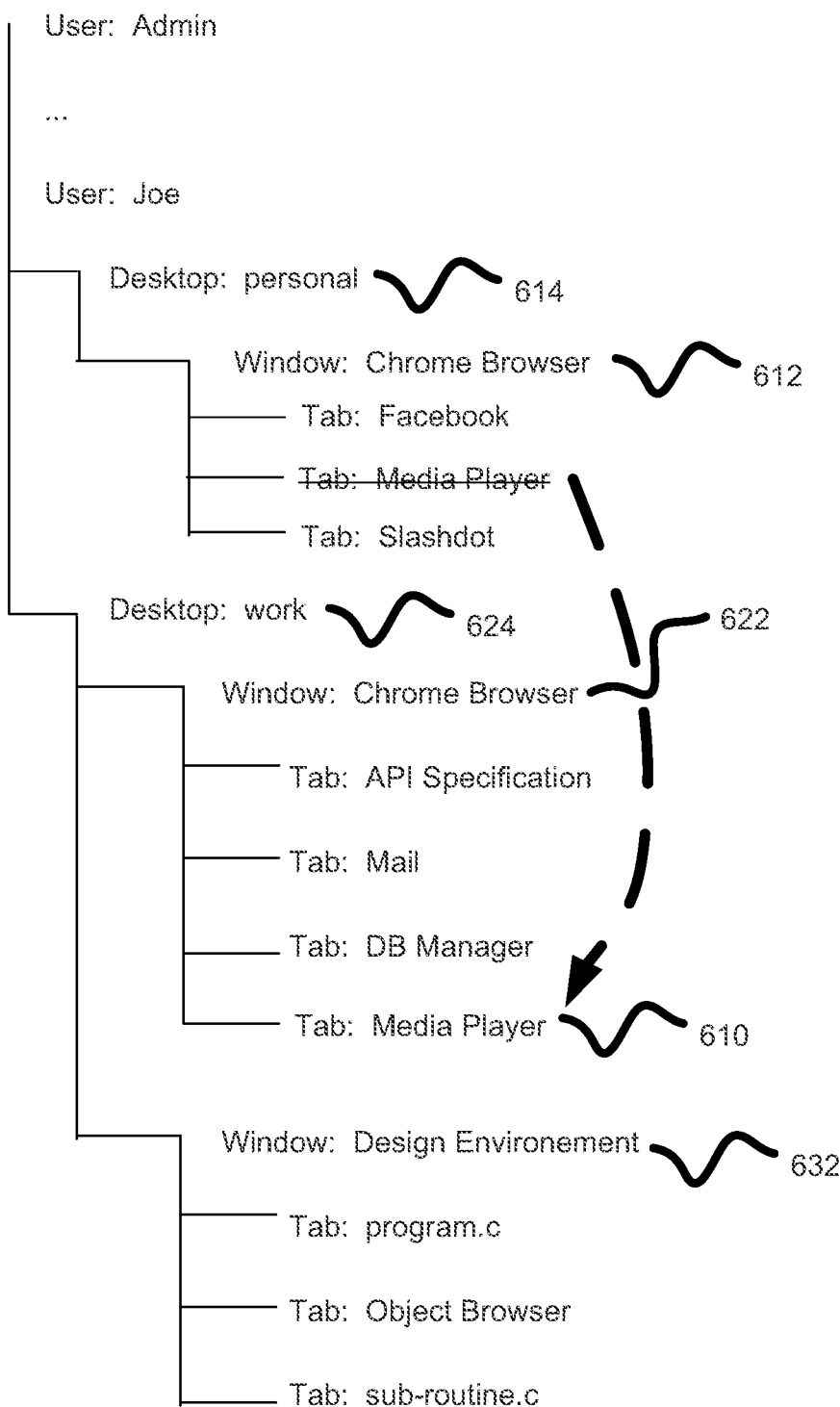

FIGS. 6a and 6b are a series of diagrams of an example embodiment of a system 600 of graphical user interface elements in accordance with the disclosed subject matter. In various embodiments, the window-tab hierarchal relationship may not be the only relationship within the hierarchy of UI elements.

System 600 illustrates a multi-level hierarchal system of GUI elements. In the illustrated embodiment (numbering shown in FIG. 6a), the system 600 starts with a user level 602 which lists each user executing tasks or applications on a given computing device (e.g., a computer, mainframe, etc.). Subordinate to the user level 602 may be a desktop level 604 which comprises one or more desktops or, as they are often referred to when a plurality of desktops are used, virtual desktops. Subordinate to the desktop level 604 may be a window level 606. Finally, the window level 606 may be superior to the tab level 608, as described above.

It is understood that the above are merely a few illustrative examples to which the disclosed subject matter is not limited. For example, in some embodiments, an application level (not shown) may be employed in place of or subordinate to the desktop level 604, or in another embodiment may be employed in place of or superior to the window level 606.

As described above, tabs (e.g., tab 610) or other UI elements (e.g., windows, etc.) may have their respective hierarchal relationships manipulated (e.g., created, deleted, moved, duplicated, etc.) by the window manager. For example, in one embodiment, a user may choose to move tab 610 from the window 612 to the window 622 (numbering shown in FIG. 6b). Although, it is understood that the above is merely one illustrative example to which the disclosed subject matter is not limited.

As described above, the movement of tab 610 may include the window manager removing or deleting the subordinate-superior relationship between the tab 610 and the window 612. In some embodiments, a subordinate-superior relationship may explicitly exist between the tab 610 and the desktop 614, in which case, the window manager may also alter this relationship. In another embodiment, the relationship may be implicit, via the relationships that tab 610 and desktop 614 have with window 612, and therefore may change as the relationship between the tab 610 and window 612 changes.

As described above, the movement of tab 610 may include the window manager creating or adding the subordinate-superior relationship between the tab 610 and the window 622. Likewise, the relationship between tab 610 and desktop 624 may be created depending upon the nature of the grandchild-grandparent or multi-level subordinate-superior relationships of the embodiment.

Further, it is understood that in various embodiments, tabs or other UI elements (e.g., windows, etc.) may be moved amongst the UI element hierarchy 600. For example, a first user (e.g., Admin) may duplicate or mirror a virtual desktop (e.g., desktop 624) from a second user (e.g., Joe), allowing both users to view the desktop and windows, tabs, etc. within or subordinate to the desktop. Or, in another example, a user (e.g., Joe) may move a window 632 and all of its associated tabs from a first desktop 624 to a second desktop 614. It is understood that the above are merely a few illustrative examples to which the disclosed subject matter is not limited.

Also, in various embodiments, a user may create a new window or other UI element by moving a tab. For example, a user may move a tab (e.g., tab 610) from a window (e.g., window 606) to the desktop or other UI element. In response, the window manager, may create a new window to include the moved tab. It is understood that the above are merely a few illustrative examples to which the disclosed subject matter is not limited.

In some embodiments, a user may associate multiple tabs (e.g., tab 610, etc.) together into a tab group. In such an embodiment, such a tab group may be manipulated en masse or all together. For example, a user may go to a news site and open a number of tabs, each tab displaying a story from the news site. These tabs may be grouped together. The user may then, move or otherwise manipulate the entire tab group from one window to another. In various embodiments, the tabs comprising a tab group may be referred to as "subtabs."

Figure 7:
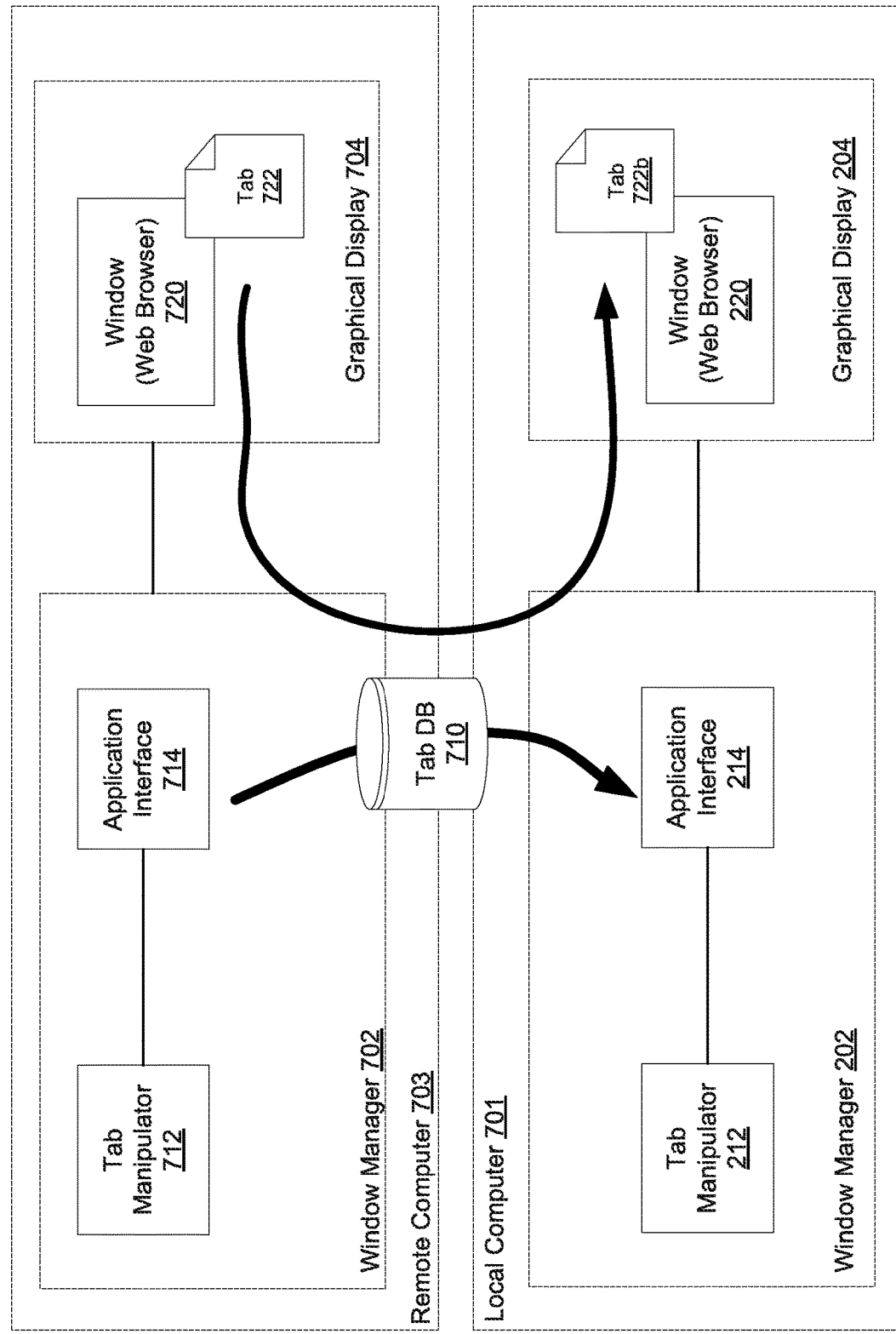
FIG. 7 is a diagram of an example embodiment of a system in accordance with the disclosed subject matter.

FIG. 7 is a block diagram of an example embodiment of a system 700 in accordance with the disclosed subject matter. In one embodiment, the system 700 may include a first or local computer 701 (e.g., tablet, laptop, etc.) and a second or remote computer 703 (e.g., a desktop, a second laptop, etc.). In such an embodiment, a user (not shown) may wish to move, duplicate, or otherwise manipulate one or more tabs or other UI elements across computers 701 & 703.

In the illustrated embodiment, a user may wish to move a tab 722 from their remote (e.g., bedroom) computer 703 to a local (e.g., living room) computer 701. The user may be physically situated at their local computer 701. In this example the user may have been viewing a web page (via tab 722) on their bedroom computer 703, moved downstairs to their living room, and wish to continue viewing that web page on their now local living room computer 701, although it is understood that the above is merely one illustrative example to which the disclosed subject matter is not limited.

In such an embodiment, the local computer 701 may include a window manager 202 and a display 204. The window manager 202 may include tab manipulator 212 and application interface 214. The window manager 202 may further include elements illustrated in FIG. 2, as described above. The display 204 may show or display window 220, possibly a web browser. Likewise, remote computer 703 may include a window manger 702, having a tab manipulator 712, application interface 714, and tab DB or registry 710. The remote computer 703 may include a display 704 showing or displaying a window 720 with a tab 722.

In various embodiments, the user, from the local computer 701, may request to see or otherwise be made aware of the tabs (e.g., tab 722) or other UI elements (e.g., window 720) included in the remote computer 703. The user may then instruct the remote computer 703 to manipulate the tabs in some way. In this embodiment, the user may request that tab 722 may be moved from remote computer 703 to local computer 701.

In such an embodiment, the window manager 702 of the remote computer 703 may transmit, in whole or part, the window manager's 702 tab DB or registry 710. In one embodiment, the window manager 702 may only transmit the hierarchal relationships of the UI elements subordinate to the user (e.g., desktops, windows, tabs, etc.). In another embodiment, the window manager 702 may only transmit the hierarchal relationships of the UI elements but not extra information (e.g., most recently used, URL information, status, state, etc.).

The user may, in the illustrated embodiment, the user may select or command that a UI element (e.g., tab 722) be moved or copied from the remote computer 703 to the local computer 701. In such an embodiment, if the transmitted portion of the remote tab DB or registry 710 does not include enough information to create the tab 772 locally, the local window manager 202 may request the additional information (e.g., URL, status, filename, etc.) from the remote window manager 702. The local window manager 202 may then access the information regarding the copied or moved tab 772 from the received portion of the tab DB 710.

Using this information the local window manager 202 may instruct or request that the window 220, or application thereof, create a tab 722b that is substantially equivalent to the remote tab 722. Likewise, if the tab 722 is to be moved, as opposed to merely copied, the local window manager 202 may transmit a message to the remote window manager 702. This message may request that the window manager 702 delete the tab 722. The remote window manager 702 may request, via tab manipulator 712 and application interface 714, that the window 720 or application thereof delete tab 722.

It is understood that the above is merely one illustrative example to which the disclosed subject matter is not limited. In various embodiments, other UI element manipulation actions may be performed across two or more machines or computers. Further, in some embodiments, a variety of UI elements (e.g., desktops, windows, tabs, etc.) may be manipulated between two or more machines or computers.

Figure 8:
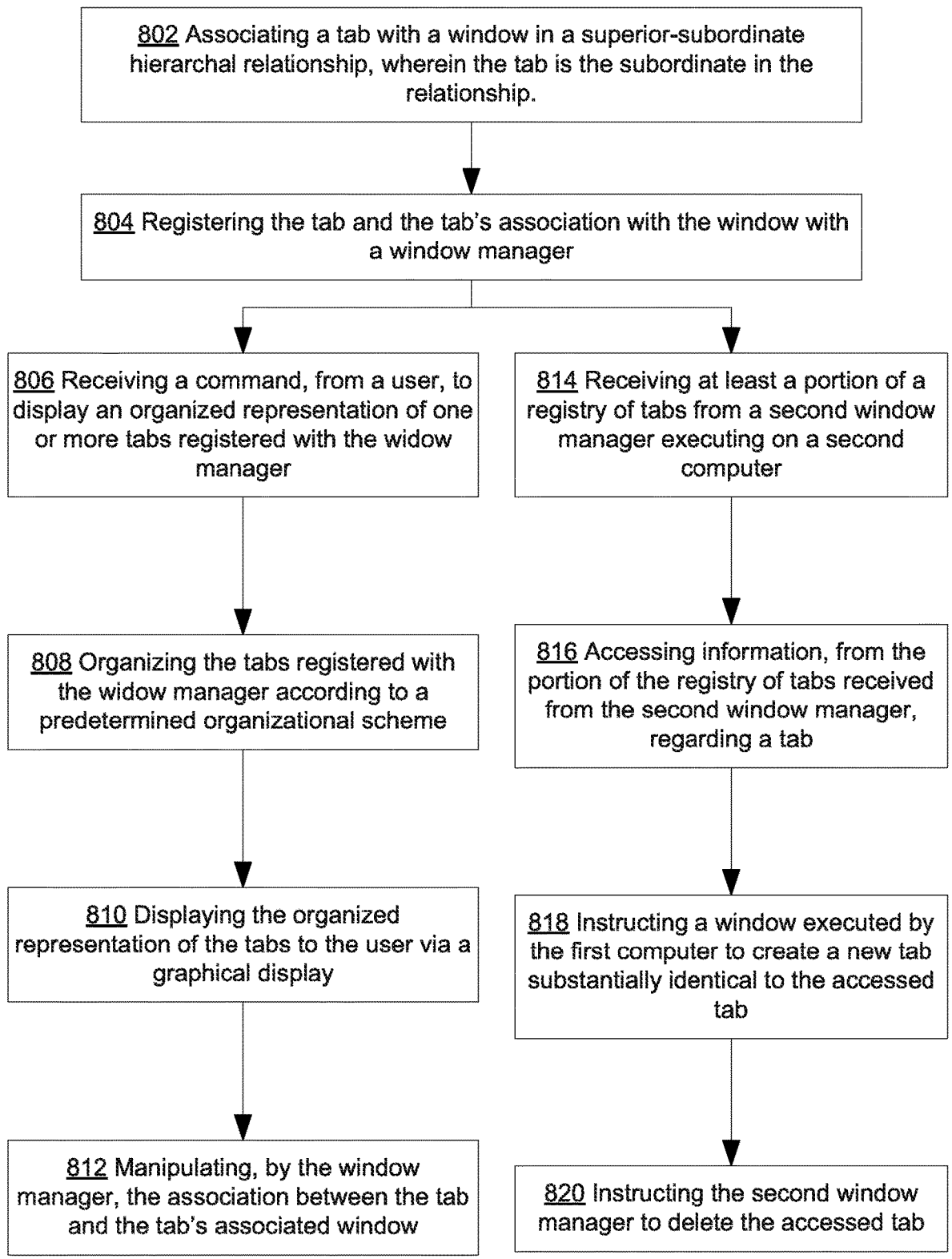
FIG. 8 is a flow chart of an example embodiment of a technique in accordance with the disclosed subject matter.

FIG. 8 is a flow chart of an example embodiment of a technique in accordance with the disclosed subject matter. In various embodiments, the technique 800 may be used or produced by the systems such as those of FIG. 1, 2, or 7. Furthermore, portions of technique 800 may be used or produced by the systems such as that of FIG. 3, 4, 5, 6a, or 6b. Although, it is understood that the above are merely a few illustrative examples to which the disclosed subject matter is not limited. It is understood that the disclosed subject matter is not limited to the ordering of or number of actions illustrated by technique 800.

Block 802 illustrates that, in one embodiment, a tab may be associated with a window in a superior-subordinate hierarchal relationship, wherein the tab is the subordinate in the relationship, as described above. In various embodiments, the tab and window may be GUI elements, as described above. In some embodiments, the window may be associated in a superior-subordinate hierarchal relationship with a virtual desktop, where the window is the subordinate in the relationship, as described above. In various embodiments, one or more of the action(s) illustrated by this Block may be performed by the apparatuses or systems of FIG. 1, 2, or 7, the window manager 202 or application interface 214 of FIG. 2, as described above.

Block 804 illustrates that, in one embodiment, the tab and the tab's association with the window may be registered with a window manager, as described above. As described above, the window manager may be configured to manage tabs and windows within a graphical user interface. In various embodiments, one or more of the action(s) illustrated by this Block may be performed by the apparatuses or systems of FIG. 1, 2, or 7, the window manager 202 or tab registry 210 of FIG. 2, as described above.

Block 806 illustrates that, in one embodiment, a command may be received (e.g., from a user) to display an organized representation of one or more tabs registered with the widow manager, as described above. In various embodiments, one or more of the action(s) illustrated by this Block may be performed by the apparatuses or systems of FIG. 1, 2, or 7, the window manager 202 or tab selection manager 218 of FIG. 2, as described above.

Block 808 illustrates that, in one embodiment, the tabs registered with the widow manager may be organized according to a predetermined organizational scheme, as described above. In various embodiments, organizing the tabs may include organizing the tabs irrespective of the tabs' associations with the tabs' respective windows, as described above. In another embodiment, organizing the tabs may include organizing the tabs irrespective of an organizational scheme employed by the tabs' windows to arrange the respective tabs within the windows, as described above. In various embodiments, one or more of the action(s) illustrated by this Block may be performed by the apparatuses or systems of FIG. 1, 2, or 7, the window manager 202 or tab organizer 216 of FIG. 2, as described above.

Block 810 illustrates that, in one embodiment, the organized representation of the tabs may be displayed to the user via a graphical display, as described above. In various embodiments, displaying the representation of the tabs includes displaying an active thumbnail of the tabs, as described above. In various embodiments, one or more of the action(s) illustrated by this Block may be performed by the apparatuses or systems of FIG. 1, 2, or 7, the window manager 202 or tab selection manager 218 of FIG. 2, as described above.

Block 812 illustrates that, in one embodiment, the association and hierarchical relationship between the tab and the tab's associated window may be manipulated, as described above. In various embodiments, manipulating may include disassociating the tab from a first window and associating the tab in a superior-subordinate hierarchal relationship with a second window, wherein the second window is the superior in the relationship, as described above. In various embodiments, one or more of the action(s) illustrated by this Block may be performed by the apparatuses or systems of FIG. 1, 2, or 7, the window manager 202 or tab manipulator 212 of FIG. 2, as described above.

Block 814 illustrates that, in one embodiment, at least a portion of a registry of tabs from a second window manager executing on a second computer may be received by a first computer, as described above. In various embodiments, one or more of the action(s) illustrated by this Block may be performed by the apparatuses or systems of FIG. 1, 2, or 7, the window managers 202 & 702 or tab registry 710 of FIG. 2 or 7, as described above.

Block 816 illustrates that, in one embodiment, the information, from the portion of the registry of tabs received from the second window manager, regarding a tab may be accessed by the first window manager, as described above. In various embodiments, one or more of the action(s) illustrated by this Block may be performed by the apparatuses or systems of FIG. 1, 2, or 7, the window managers 202 & 702 or tab registry 710 of FIG. 2 or 7, as described above.

Block 818 illustrates that, in one embodiment, a window executed by the first computer may be instructed to create a new tab substantially identical to the accessed tab, as described above. In various embodiments, one or more of the action(s) illustrated by this Block may be performed by the apparatuses or systems of FIG. 1, 2, or 7, the window managers 202 & 702 or tab manipulator 212 of FIG. 2 or 7, as described above.

Block 820 illustrates that, in one embodiment, the second window manager may be instructed, for example by the widow manager, to delete the accessed tab, as described above. In various embodiments, one or more of the action(s) illustrated by this Block may be performed by the apparatuses or systems of FIG. 1, 2, or 7, the window managers 202 & 702 or tab manipulators 212 & 712 of FIG. 2 or 7, as described above.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosed subject matter.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
    rendering a first tab and a second tab within a first window of a computing device;
    registering, in a user interface element registry, the first and second tabs and a relationship of the first and second tabs with the first window;
    rendering a third tab and a fourth tab within a second window;
    registering, in the user interface element registry, the third and fourth tabs and a relationship of the third and fourth tabs with the second window;
    receiving a first user command to render an organized representation of tabs registered in the user interface element registry;
    rendering, in response to the first user command, an arrangement of a plurality of tabs, including the first through fourth tabs, on the computing device according to the organized representation such that the first through fourth tabs are displayed without reference to their associated windows;
    wherein the organized representation includes the first through fourth tabs being arranged according to a history of when the first through fourth tabs were accessed;
    associating the third and fourth tabs into a tab group;
    receiving a second user command to move the tab group from the second window to the first window; and
    rendering the first through fourth tabs in the first window.

2. The method of claim 1, further comprising:
receiving, over a network, information identifying a remote tab opened on a browser application associated with a user account and executing on a remote computing device;
updating the user interface element registry to include the remote tab;
rendering a list of tabs opened on computing devices associated with the user account;
receiving an indication that the remote tab has been selected from the list of tabs; and
rendering, in response to the indication, the remote tab on the computing device.

3. The method of claim 2, wherein the list of tabs includes an identifier of the remote computing device.

4. The method of claim 1, further comprising:
receiving a third user command to move the first tab from the first window to a third window;
in response to the third user command, updating the user interface element registry to register the first tab with the third window; and
rendering the first tab in the third window.

5. The method of claim 1, further comprising:
registering, in the user interface element registry, a relationship of the first window with a first desktop;
receiving a third user command to create a second desktop;
receiving a fourth user command to move the first window to the second desktop;
in response to the fourth user command, updating the user interface element registry to register the first window, including the first through fourth tabs, with the second desktop; and
displaying the first through fourth tabs in the second desktop.

6. The method of claim 1, further comprising:
receiving a third user command to cycle through the plurality of tabs in the organized representation regardless of which window a respective tab belongs.

7. The method of claim 1, wherein the arrangement of the plurality of tabs includes a cascade display of the plurality of tabs.

8. The method of claim 1, further comprising:
rendering a thumbnail version of the first tab and a thumbnail version of the second tab according to the organized representation.

9. The method of claim 8, wherein the thumbnail version of the first tab includes changes occurring to information included within the first tab.

10. A non-transitory computer-readable medium storing executable instructions that when executed by at least one processor cause the at least one processor to execute operations, the operations comprising:
rendering a first tab and a second tab within a first window of a computing device;
registering, in a user interface element registry, the first and second tabs and a relationship of the first and second tabs with the first window;
rendering a third tab and a fourth tab within a second window;
registering, in the user interface element registry, the third and fourth tabs and a relationship of the third and fourth tabs with the second window, the first through fourth tabs including browser tabs created by a browser application associated with a user account;
receiving a first user command to render an organized representation of tabs registered in the user interface element registry;
rendering, in response to the first user command, an arrangement of a plurality of tabs, including the first through fourth tabs, on the computing device according to the organized representation such that the first through fourth tabs are displayed without reference to their associated windows;
wherein the organized representation includes the first through fourth tabs being arranged according to a history of when the first through fourth tabs were accessed;
associating the third and fourth tabs into a tab group;
receiving a second user command to move the tab group from the second window to the first window; and
rendering the first through fourth tabs in the first window.

11. The non-transitory computer-readable medium of claim 10, wherein the operations further comprise:
receiving, over a network, information identifying a remote tab opened on a browser application associated with the user account and executing on a remote computing device;
updating the user interface element registry to include the remote tab;
rendering a list of tabs opened on computing devices associated with the user account;
receiving an indication that the remote tab has been selected from the list of tabs; and
rendering, in response to the indication, the remote tab on the computing device.

12. The non-transitory computer-readable medium of claim 11, wherein the list of tabs includes an identifier of the remote computing device.

13. The non-transitory computer-readable medium of claim 10, wherein the operations further comprise:
receiving a third user command to move the first tab from the first window to a third window;
in response to the third user command, updating the user interface element registry to register the first tab with the third window; and
rendering the first tab in the third window.

14. The non-transitory computer-readable medium of claim 10, wherein the operations further comprise:
registering, in the user interface element registry, a relationship of the first window with a first desktop;
receiving a third user command to create a second desktop;
receiving a fourth user command to move the first window to the second desktop;
in response to the fourth user command, updating the user interface element registry to register the first window, including the first through fourth tabs, with the second desktop; and
displaying the first through fourth tabs in the second desktop.

15. A computing device comprising:
at least one processor; and
a non-transitory computer-readable medium storing executable instructions that cause the at least one processor to:
render a first tab and a second tab within a first window of a computing device;
register, in a user interface element registry, the first and second tabs and a relationship of the first and second tabs with the first window;

render a third tab and a fourth tab within a second window;
register, in the user interface element registry, the third and fourth tabs and a relationship of the third and fourth tabs with the second window;
receiving a first user command to render an organized representation of tabs registered in the user interface element registry;
rendering, in response to the first user command, an arrangement of a plurality of tabs, including the first through fourth tabs, on the computing device according to the organized representation such that the first through fourth tabs are displayed without reference to their associated windows;
wherein the organized representation includes the first through fourth tabs being arranged according to a history of when the first through fourth tabs were accessed;
associate the third and fourth tabs into a tab group;
receive a second user command to move the tab group from the second window to the first window; and
render the first through fourth tabs in the first window.

16. The computing device of claim 15, wherein the executable instructions include instructions that cause that least one processor to:

receive, over a network, information identifying a remote tab opened on a browser application associated with a user account and executing on a remote computing device;
update the user interface element registry to include the remote tab;
render a list of tabs opened on computing devices associated with the user account;
receive an indication that the remote tab has been selected from the list of tabs; and
render, in response to the indication, the remote tab on the computing device, wherein the list of tabs includes an identifier of the remote computing device.

17. The computing device of claim 15, wherein the executable instructions include instructions that cause the at least one processor to:

receive a third user command to move the first tab from the first window to a third window;
in response to the third user command, update the user interface element registry to register the first tab with the third window; and
render the first tab in the third window.

* * * * *